United States Patent
Reese, II

(10) Patent No.: US 11,846,215 B1
(45) Date of Patent: Dec. 19, 2023

(54) EXHAUST BURNER HEAT DELIVERY TO CATALYST BY RESTRICTING UPSTREAM FLOW AND HEAT LEAKAGE PATHS

(71) Applicant: FCA US LLC, Auburn Hills, MI (US)

(72) Inventor: Ronald Reese, II, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/987,339

(22) Filed: Nov. 15, 2022

(51) Int. Cl.
| | |
|---|---|
| F01N 3/20 | (2006.01) |
| F01N 3/28 | (2006.01) |
| F02B 37/18 | (2006.01) |
| F02N 11/08 | (2006.01) |
| F02D 13/02 | (2006.01) |
| F02B 37/24 | (2006.01) |

(52) U.S. Cl.
CPC ......... *F01N 3/2033* (2013.01); *F01N 3/2892* (2013.01); *F02B 37/183* (2013.01); *F02B 37/24* (2013.01); *F02D 13/0207* (2013.01); *F02D 13/0261* (2013.01); *F02N 11/08* (2013.01); *F02D 2013/0292* (2013.01)

(58) Field of Classification Search
CPC ...... F01N 3/0235; F01N 3/025; F01N 3/2033; F01N 2240/14; F01N 2240/36
See application file for complete search history.

(56) References Cited

U.S. PATENT DOCUMENTS

| | | | |
|---|---|---|---|
| 5,375,997 A | 12/1994 | Nakamura et al. | |
| 7,021,047 B2 | 4/2006 | Hilden et al. | |
| 7,128,047 B2 | 10/2006 | Kuo et al. | |
| 2006/0241851 A1* | 10/2006 | Berger | F02D 13/08 701/112 |
| 2009/0183497 A1* | 7/2009 | Arakawa | F02D 9/04 60/299 |
| 2011/0072797 A1* | 3/2011 | Van Nieuwstadt | F01N 3/0238 60/296 |
| 2012/0125311 A1 | 5/2012 | Grammens et al. | |
| 2012/0186231 A1* | 7/2012 | Lindblom | F01N 3/2033 60/274 |
| 2021/0310429 A1* | 10/2021 | Kiwan | F02D 13/06 |

FOREIGN PATENT DOCUMENTS

| | | |
|---|---|---|
| DE | 102018122875 A1 | 3/2020 |
| JP | 2004316594 A | 11/2004 |

\* cited by examiner

Primary Examiner — Jonathan R Matthias
(74) Attorney, Agent, or Firm — Jeremy J. Klobucar

(57) ABSTRACT

Heat energy retainment systems and methods involve a set of devices configured to restrict or stop an upstream flow and release of heat energy from exhaust gas upstream from an exhaust burner upstream from a catalyst in an exhaust system of an internal combustion engine and a controller configured to proximate to cold starts of the engine, control the exhaust burner to increase a temperature of the catalyst to a desired operating temperature and, during engine off periods, control the set of devices to retain the heat energy in the exhaust system proximate to the exhaust burner and the catalyst, wherein the retainment of the heat energy in the exhaust system during engine off periods decreases a duration of engine cold starts by decreasing catalyst light-off time.

17 Claims, 2 Drawing Sheets

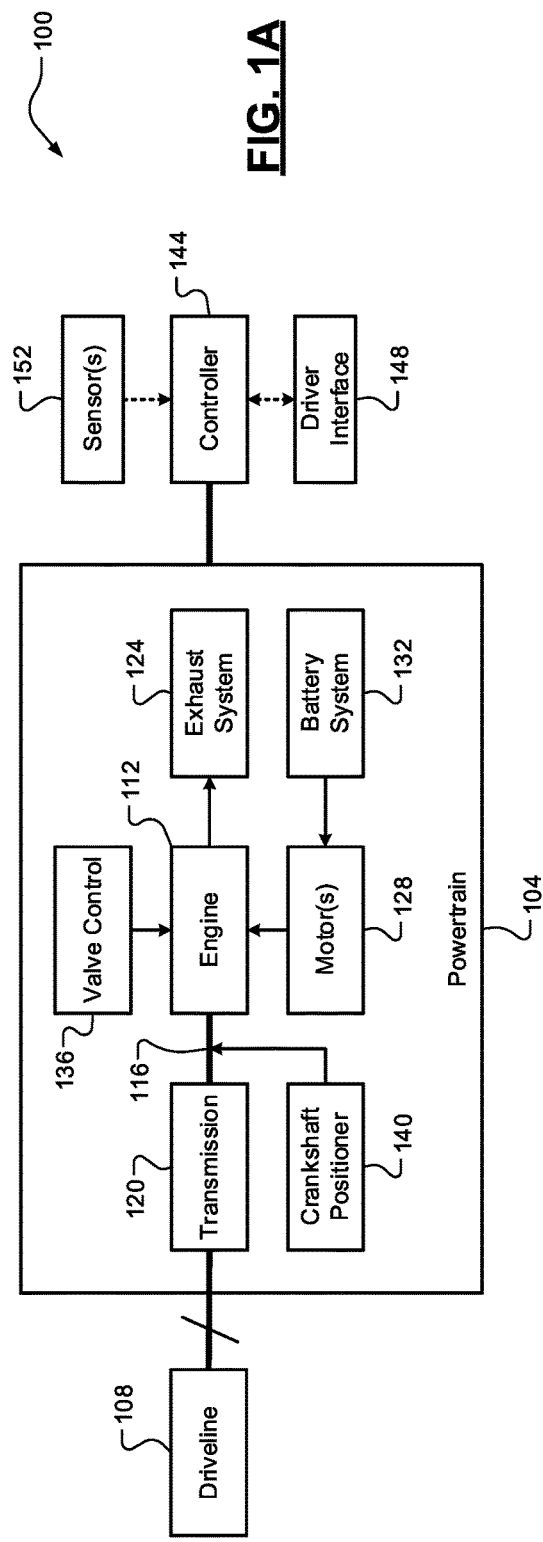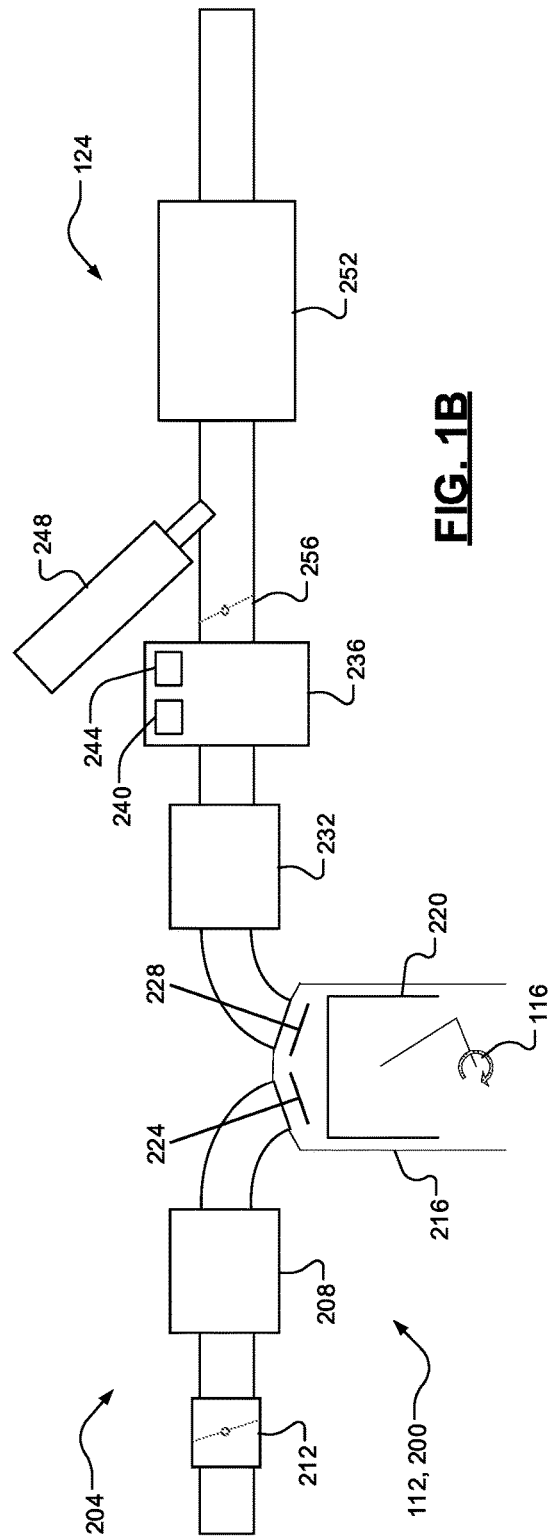

EXHAUST BURNER HEAT DELIVERY TO CATALYST BY RESTRICTING UPSTREAM FLOW AND HEAT LEAKAGE PATHS

FIELD

The present application generally relates to exhaust systems for internal combustion engines and, more particularly, to improved exhaust burner heat delivery to a catalyst by restricting upstream flow and heat leakage paths.

BACKGROUND

An exhaust burner is a device in an exhaust system of an internal combustion engine that is configured to combust a fuel/air mixture to generate heat energy (e.g., hot gas) that is provided at a point in the exhaust system. The exhaust burner is typically fired during a cold engine start event, either prior to engine start or after, to add supplemental heat to a catalyst in the exhaust system (e.g., a catalytic converter). This additional heat warms the catalyst up to its effective conversion temperature more quickly, thereby mitigating or eliminating tailpipe emissions. The exhaust burner therefore enables an engine to meet a tailpipe emissions standard it could otherwise not meet, and/or reduce the precious metal (e.g., platinum) loading of the catalyst, thereby reducing costs. When the exhaust burner fires during engine off periods, however, heat in the exhaust system can leak out through various channels, such as upstream from the exhaust burner and the catalyst, which has a potentially negative effect on tailpipe emissions. Thus, while these conventional exhaust systems do work for their intended purpose, there exists an opportunity for improvement in the relevant art.

SUMMARY

According to one example aspect of the invention, a heat energy retainment system for an internal combustion engine having an exhaust system with an exhaust burner arranged upstream from a catalyst is presented. In one exemplary implementation, the heat energy retainment system comprises a set of devices configured to restrict or stop an upstream flow and release of heat energy from exhaust gas upstream from the exhaust burner and the catalyst, and a controller configured to proximate to cold starts of the engine, control the exhaust burner to increase a temperature of the catalyst to a desired operating temperature and, during engine off periods, control the set of devices to retain the heat energy in the exhaust system proximate to the exhaust burner and the catalyst, wherein the retainment of the heat energy in the exhaust system during engine off periods decreases a duration of engine cold starts by decreasing catalyst light-off time.

In some implementations, the set of devices includes an additional valve disposed in the exhaust system upstream from the exhaust burner and the catalyst, and the additional valve is configured to be commanded closed by the controller to retain the heat energy in the exhaust system. In some implementations, the engine further comprises a turbocharger disposed upstream from the exhaust burner and the catalyst and powered by kinetic energy of the exhaust gas in the exhaust system, and the set of devices comprises at least one of a set of vanes and a wastegate of the turbocharger that are each configured to be commanded closed by the controller to retain the heat energy in the exhaust system.

In some implementations, the engine further comprises a plurality of cylinders each comprising a piston coupled to a common crankshaft and a pair of intake and exhaust valves, and the set of devices comprises at least one of the crankshaft, the exhaust valves, and other systems configured to control the crankshaft and/or the exhaust valves. In some implementations, the set of devices comprises the crankshaft or another system configured to control a position of the crankshaft, and the controller is configured to command the crankshaft such that there is no overlap or the overlap is minimized between opening of the intake and exhaust valves of any respective cylinders to retain the heat energy in the exhaust system. In some implementations, the set of devices comprises an electric motor configured to power the crankshaft, and the controller is configured to command the electric motor to motor the crankshaft and thereby the engine such that a positive pressure is generated to retain the heat energy in the exhaust system.

In some implementations, the set of devices comprises a valve control system configured to control lift/position of the intake/exhaust valves of the cylinders, and the controller is configured to command the valve control system to close the exhaust valves of all respective cylinders to retain the heat energy in the exhaust system. In some implementations, the set of devices comprises two or more of (i) an additional valve disposed in the exhaust system upstream from the exhaust burner and the catalyst, (ii) at least one of a set of vanes and a wastegate of a turbocharger powered by kinetic energy of the exhaust gas, (iii) a crankshaft or another system configured to control a position of the crankshaft, (iv) an electric motor configured to power the crankshaft and thereby motor the engine, and (v) a valve control system configured to control lift/position of the intake/exhaust valves of the cylinders. In some implementations, the set of devices comprises (i) an additional valve disposed in the exhaust system upstream from the exhaust burner and the catalyst, (ii) at least one of a set of vanes and a wastegate of a turbocharger powered by kinetic energy of the exhaust gas, (iii) a crankshaft or another system configured to control a position of the crankshaft, (iv) an electric motor configured to power the crankshaft and thereby motor the engine, and (v) a valve control system configured to control lift/position of the intake/exhaust valves of the cylinders.

According to another example aspect of the invention, a heat retainment method for an internal combustion engine having an exhaust system with an exhaust burner arranged upstream from a catalyst is presented. In one exemplary implementation, the heat retainment method comprises providing a set of devices configured to restrict or stop an upstream flow and release of heat energy from exhaust gas upstream from the exhaust burner and the catalyst, proximate to cold starts of the engine, controlling, by a controller of the engine, the exhaust burner to increase a temperature of the catalyst to a desired operating temperature, and during engine off periods, controlling, by the controller, the set of devices to retain the heat energy in the exhaust system proximate to the exhaust burner and the catalyst, wherein the retainment of the heat energy in the exhaust system during engine off periods decreases a duration of engine cold starts by decreasing catalyst light-off time.

In some implementations, the set of devices includes an additional valve disposed in the exhaust system upstream from the exhaust burner and the catalyst, and the additional valve is configured to be commanded closed by the controller to retain the heat energy in the exhaust system. In some implementations, the engine further comprises a turbocharger disposed upstream from the exhaust burner and the catalyst and powered by kinetic energy of the exhaust gas in the exhaust system, and the set of devices comprises at least one of a set of vanes and a wastegate of the turbocharger that are each configured to be commanded closed by the controller to retain the heat energy in the exhaust system.

In some implementations, the engine further comprises a plurality of cylinders each comprising a piston coupled to a common crankshaft and a pair of intake and exhaust valves, and the set of devices comprises at least one of the crankshaft, the exhaust valves, and other systems configured to control the crankshaft and/or the exhaust valves. In some implementations, the set of devices comprises the crankshaft or another system configured to control a position of the crankshaft, and the controller is configured to command the crankshaft such that there is no overlap or the overlap is minimized between opening of the intake and exhaust valves of any respective cylinders to retain the heat energy in the exhaust system. In some implementations, the set of devices comprises an electric motor configured to power the crankshaft, and the controller is configured to command the electric motor to motor the crankshaft and thereby the engine such that a positive pressure is generated to retain the heat energy in the exhaust system.

In some implementations, the set of devices comprises a valve control system configured to control lift/position of the intake/exhaust valves of the cylinders, and the controller is configured to command the valve control system to close the exhaust valves of all respective cylinders to retain the heat energy in the exhaust system. In some implementations, the set of devices comprises two or more of (i) an additional valve disposed in the exhaust system upstream from the exhaust burner and the catalyst, (ii) at least one of a set of vanes and a wastegate of a turbocharger powered by kinetic energy of the exhaust gas, (iii) a crankshaft or another system configured to control a position of the crankshaft, (iv) an electric motor configured to power the crankshaft and thereby motor the engine, and (v) a valve control system configured to control lift/position of the intake/exhaust valves of the cylinders. In some implementations, the set of devices comprises (i) an additional valve disposed in the exhaust system upstream from the exhaust burner and the catalyst, (ii) at least one of a set of vanes and a wastegate of a turbocharger powered by kinetic energy of the exhaust gas, (iii) a crankshaft or another system configured to control a position of the crankshaft, (iv) an electric motor configured to power the crankshaft and thereby motor the engine, and (v) a valve control system configured to control lift/position of the intake/exhaust valves of the cylinders.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

BRIEF DESCRIPTION OF THE DRAWINGS

FIGS. 1A-1B are a functional block diagram and a side or cross-sectional view of an engine and an exhaust system and a heat energy retainment system according to the principles of the present application.

DESCRIPTION

Figure 2:
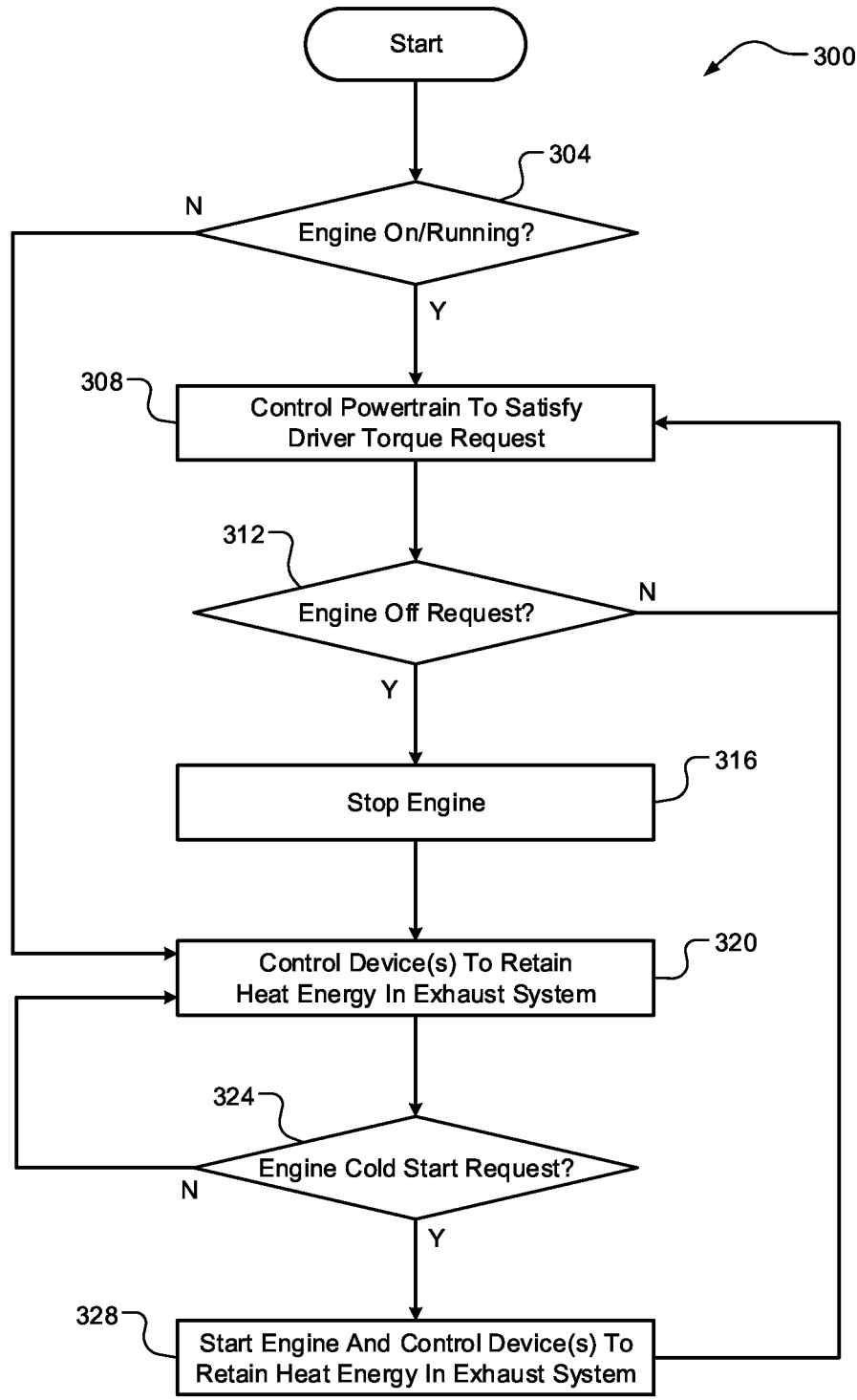
FIG. 2 is a flow diagram of an example heat energy retainment method for an engine exhaust system having an exhaust burner arranged upstream of a catalyst according to the principles of the present application.

As previously discussed, an exhaust burner is typically fired during a cold engine start event, either prior to engine start or after, to add supplemental heat to a catalyst in the exhaust system (e.g., a catalytic converter). This additional heat warms the catalyst up to its effective conversion temperature more quickly, thereby mitigating or eliminating tailpipe emissions. The exhaust burner therefore enables an engine to meet a tailpipe emissions standard it could otherwise not meet, and/or reduce the precious metal (e.g., platinum) loading of the catalyst, thereby reducing cost. When the exhaust burner fires during engine off periods, however, heat in the exhaust system can leak out through various channels, such as upstream from the exhaust burner and the catalyst, which could cause increased tailpipe emissions due to the catalyst taking longer to reach its light-off temperature and potentially increase catalyst coating costs.

Accordingly, improved heat energy retainment systems and methods for an internal combustion engine having an exhaust system with an exhaust burner arranged upstream from a catalytic converter are presented. The heat energy retainment systems and methods operate by preventing upstream leakage during engine off periods in a plurality of different ways, or in combinations thereof. These include (i) an additional valve disposed in the exhaust system upstream from the exhaust burner and the catalyst, (ii) at least one of a vane or a set of vanes and a wastegate of a turbocharger powered by kinetic energy of the exhaust gas, (iii) the crankshaft or another system configured to control a position of the crankshaft, (iv) an electric motor configured to power the crankshaft and thereby motor the engine, and (v) a valve control system configured to control lift/position of the intake/exhaust valves of the cylinders.

Referring now to FIGS. 1A-1B, a functional block diagram and a side or cross-sectional view of an internal combustion engine 112 and an exhaust system 124 and a heat energy retainment system according to the principles of the present application are illustrated. The heat energy retainment system generally comprises a controller 144 of the engine 112 and one or more different "sets of devices" each being configured to restrict or stop an upstream flow and release of heat energy from exhaust gas from exhaust gas upstream from an exhaust burner 248 and a 252 catalyst (e.g., a three-way catalytic converter). A vehicle 100 generally comprises a powertrain 104 configured to generate and transfer drive torque to a driveline 108. The powertrain comprises the engine 112, which combusts a mixture of fuel (e.g., gasoline) and air to generate drive torque at a crankshaft 116, which is then selectively transferred to the driveline 108 via a transmission 120. Exhaust gas resulting from combustion of the fuel/air mixture is expelled into the exhaust system 124.

In some implementations, the powertrain 104 is an electrified powertrain that further comprises one or more electric motors 128 that are powered by electrical energy (e.g., current) from a battery system 132. The electric motor(s) 128 are configured to generate drive torque that could be used in a variety of ways, such as for starting/cranking the crankshaft 116 of the engine 112 (e.g., a belt-drive starter-generator, or BSG unit), and/or for vehicle propulsion in a series or parallel configuration. In some implementations, the powertrain 104 further comprises other engine-related systems, such as, but not limited to, a valve control system 136 and a crankshaft positioner system 140. The powertrain 104 and is controlled by a controller 144 of the vehicle 100, primarily to generate a desired amount of drive torque to satisfy a driver torque request provided/input by a driver via a driver interface 148 (e.g., an accelerator pedal).

The controller 144 also monitors various parameters (speeds, temperatures, etc.) as measured and/or modeled based on data received from one or more sensors 152, including ambient temperature, engine temperature (e.g., engine coolant temperature), and exhaust gas temperature. The operation of the engine 112 will now be described in greater detail as depicted in example side or cross-sectional view 200 of FIG. 1B. Initially, air is drawn into an intake manifold 208 through an induction system 204 that is selectively regulated by a throttle valve 212. The air in the intake manifold is distributed to a plurality of cylinders 216 each having a respective piston 220 and combined with fuel (e.g., gasoline) from a fuel system (not shown) configured in any suitable manner (port fuel injection, direct fuel injection, etc.). For each cylinder 216, a respective intake valve 224 is opened, a respective exhaust valve is closed 228, and the fuel/air charge resides in a combustion chamber of the cylinder 216.

The intake valve 224 is then closed and the fuel/air mixture is compressed by the respective piston 220 and then ignited (e.g., by spark from a respective spark plug, now shown) to combust the fuel/air mixture and drive the piston 220 downwards, thereby generating drive torque at the crankshaft 116. The exhaust valve 228 is then opened and exhaust gas resulting from combustion is expelled into an exhaust manifold 232 of the exhaust system 124. An optional turbocharger 236 having at least one of a vane or a set of vanes 240 (e.g., a variable geometry turbine with many vanes/airfoils locates circumferentially around the turbine wheel) and a wastegate valve 244 for controlling/releasing exhaust gas pressure is powered by kinetic energy of the exhaust gas and utilized to force air through the induction system 204 ("forced induction") for greater air charges and greater engine power capability. The catalyst 252 chemically reacts with the exhaust gas to mitigate or eliminate emissions (e.g., nitrogen oxides (NOx), carbon monoxide (CO), and hydrocarbons, HC)) before release into the atmosphere.

The exhaust burner 248 is selectively operated to raise the exhaust gas temperature to warm the catalyst to its optimal operating point for chemical conversion (also known as its "light-off" temperature). As previously mentioned, heat energy of the exhaust gas could potentially leak out of the exhaust system 124 via an upstream path during engine off periods. This is because during when the exhaust burner is fired during engine off periods, there is a pressure difference (i.e., no positive pressure being generated by the engine 112). Therefore, the controller 144 is configured to control at least one "set of devices" to mitigate or eliminate upstream heat energy leakage and thereby retain the heat energy of the exhaust gas in the exhaust system 124 during engine off periods. In turn, this will shorten the catalyst light-off time upon cold starting/restarting of the engine 112 and will thereby decrease or improve the catalyst light-off time. Another potential benefit could be reducing the amount of fuel consumed by the exhaust burner 248 thus increasing its efficiency.

Each "set of devices" comprises one or more components of the engine 112 that operate to mitigate or eliminate the upstream flow of exhaust gas and thereby leakage of heat energy from the exhaust system 124. First, a valve 256 could be added upstream from exhaust burner 248 and the valve 256 could be closed to stop heat energy leakage. Second, the vane(s) 240 and/or wastegate 244 of the optional turbocharger 236 could be controlled (e.g., closed) to stop heat energy leakage. Third, the exhaust valves 228 could be held closed by the separate valve control system 136 to stop heat energy leakage. Fourth, the crankshaft 116 could be precisely positioned such that the exhaust valves 228 are held closed or where the flow area for all exhaust valves for the plurality of cylinders is minimized. Fifth and lastly, the electric motor(s) 128 could be utilized to temporarily motor (spin) the crankshaft 116 of the engine 112 such that a positive pressure is produced thereby stopping upstream exhaust gas flow and heat energy leakage. Each of these components could be commanded in the above-described ways by the controller 144 during detected engine off periods. Depending on the specific vehicle application, a combination or all of the above-described systems/techniques could be utilized to further improve/ensure heat energy retainment.

Referring now to FIG. 2, a flow diagram of an example heat energy retainment method 300 for an engine exhaust system having an exhaust burner arranged upstream of a catalyst according to the principles of the present application is illustrated. While components of the vehicle 100 are referenced below for descriptive/illustrative purposes, it will be appreciated that the method 300 could be applicable to any suitable vehicle/engine. At 304, the controller 144 determines whether the engine 112 is on or running. When true, the method 300 proceeds to 308. When false, the method 300 ends or proceeds to 320. At 308, the controller 144 controls the engine 112 (and optionally the electric motor(s) 128) to meet/satisfy the driver torque request.

At 312, the controller 144 detects an engine off request. In response to the engine off request, the controller 144 stops the engine 112 at 316 and then controls one or more of the set of devices as described above to retain the heat energy from the exhaust gas in the exhaust system 124 at 320. At 324, the controller 144 detects for an engine cold start/restart request. If a non-cold start is requested (i.e., no burner operation), the method 300 could end or return to 304. In response to the detected cold start request, the controller 144 starts the engine 112 and operates the exhaust burner 248 with increased efficiency at 328. The method 300 then returns to 308 as this method 300 is intended to run continuously during vehicle (e.g., engine stop/start) operation.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A heat energy retainment system for an internal combustion engine having an exhaust system with an exhaust burner arranged upstream from a catalyst, the heat energy retainment system comprising:
    a set of devices each configured to restrict or stop an upstream flow and release of heat energy from exhaust gas upstream from the exhaust burner and the catalyst, wherein none of the set of devices are configured to restrict or stop a downstream flow of the exhaust gas through the catalyst and to an environment external to the vehicle;
    a controller configured to:
        proximate to cold starts of the engine, control the exhaust burner to increase a temperature of the catalyst to a desired operating temperature; and
        during engine off periods when the exhaust system has a positive pressure differential relative to the engine, control the set of devices to mitigate or eliminate the positive pressure differential and restrict or stop the upstream flow and release of the heat energy from the exhaust gas to thereby retain the heat energy in the exhaust system proximate to the exhaust burner and the catalyst,
    wherein the retainment of the heat energy in the exhaust system during engine off periods decreases a duration of engine cold starts by decreasing catalyst light-off time.

2. The heat energy retainment system of claim 1, wherein:
    the set of devices includes an additional valve disposed in the exhaust system upstream from the exhaust burner and the catalyst; and
    the additional valve is configured to be commanded closed by the controller to retain the heat energy in the exhaust system.

3. The heat energy retainment system of claim 1, wherein:
    the engine further comprises a turbocharger disposed upstream from the exhaust burner and the catalyst and powered by kinetic energy of the exhaust gas in the exhaust system; and
    the set of devices comprises at least one of a set of vanes and a wastegate of the turbocharger that are each configured to be commanded closed by the controller to retain the heat energy in the exhaust system.

4. The heat energy retainment system of claim 1, wherein:
    the engine further comprises a plurality of cylinders each comprising a piston coupled to a common crankshaft and a pair of intake and exhaust valves; and
    the set of devices comprises at least one of the crankshaft, the exhaust valves, a crankshaft positioner system configured to control a position of the crankshaft and/or the exhaust valves.

5. The heat energy retainment system of claim 4, wherein:
    the set of devices comprises the crankshaft or the crankshaft positioner system; and
    the controller is configured to command the crankshaft or the crankshaft positioner system such that there is no overlap or the overlap is minimized between opening of the intake and exhaust valves of any respective cylinders to retain the heat energy in the exhaust system.

6. The heat energy retainment system of claim 4, wherein:
    the set of devices comprises an electric motor configured to power the crankshaft; and
    the controller is configured to command the electric motor to motor the crankshaft and thereby the engine such that a positive pressure is generated to retain the heat energy in the exhaust system.

7. The heat energy retainment system of claim 1, wherein:
    the set of devices comprises a valve control system configured to control lift/position of the intake/exhaust valves of the cylinders; and
    the controller is configured to command the valve control system to close the exhaust valves of all respective cylinders to retain the heat energy in the exhaust system.

8. The heat energy retainment system of claim 1, wherein the set of devices comprises two or more of:
    (i) an additional valve disposed in the exhaust system upstream from the exhaust burner and the catalyst;
    (ii) at least one of a set of vanes and a wastegate of a turbocharger powered by kinetic energy of the exhaust gas;
    (iii) a crankshaft or a crankshaft positioner system configured to control a position of the crankshaft;
    (iv) an electric motor configured to power the crankshaft and thereby motor the engine; and
    (v) a valve control system configured to control lift/position of the intake/exhaust valves of the cylinders.

9. The heat energy retainment system of claim 1, wherein the set of devices comprises:
    (i) an additional valve disposed in the exhaust system upstream from the exhaust burner and the catalyst;
    (ii) at least one of a set of vanes and a wastegate of a turbocharger powered by kinetic energy of the exhaust gas;
    (iii) a crankshaft or a crankshaft positioner system configured to control a position of the crankshaft;
    (iv) an electric motor configured to power the crankshaft and thereby motor the engine; and
    (v) a valve control system configured to control lift/position of the intake/exhaust valves of the cylinders.

10. A heat retainment method for an internal combustion engine having an exhaust system with an exhaust burner arranged upstream from a catalyst, the heat retainment method comprising:
    providing a set of devices each configured to restrict or stop an upstream flow and release of heat energy from exhaust gas upstream from the exhaust burner and the catalyst, wherein none of the set of devices are configured to restrict or stop a downstream flow of the exhaust gas through the catalyst and to an environment external to the vehicle, and wherein the set of devices includes at least an electric motor configured to motor a crankshaft of the engine to generate a positive pressure differential at the engine relative to the exhaust system;
    proximate to cold starts of the engine, controlling, by a controller of the engine, the exhaust burner to increase a temperature of the catalyst to a desired operating temperature; and
    during engine off periods when the engine has a negative pressure differential relative to the exhaust system, controlling, by the controller, at least the electric motor of the set of devices to generate the positive pressure differential to mitigate or eliminate the negative pressure differential to thereby restrict or stop the upstream flow and release of the heat energy from the exhaust gas and to thereby retain the heat energy in the exhaust system proximate to the exhaust burner and the catalyst, wherein the retainment of the heat energy in the exhaust system during engine off periods decreases a duration of engine cold starts by decreasing catalyst light-off time.

11. The heat energy retainment method of claim 10, wherein:
- the set of devices further includes an additional valve disposed in the exhaust system upstream from the exhaust burner and the catalyst; and
- the additional valve is configured to be commanded closed by the controller to retain the heat energy in the exhaust system.

12. The heat energy retainment method of claim 10, wherein:
- the engine further comprises a turbocharger disposed upstream from the exhaust burner and the catalyst and powered by kinetic energy of the exhaust gas in the exhaust system; and
- the set of devices further comprises at least one of a set of vanes and a wastegate of the turbocharger that are each configured to be commanded closed by the controller to retain the heat energy in the exhaust system.

13. The heat energy retainment method of claim 10, wherein:
- the engine further comprises a plurality of cylinders each comprising a piston coupled to the crankshaft and a pair of intake and exhaust valves; and
- the set of devices further comprises at least one of the crankshaft, the exhaust valves, and a crankshaft positioner system configured to control a position of the crankshaft and/or the exhaust valves.

14. The heat energy retainment method of claim 13, wherein:
- the set of devices comprises the crankshaft or the crankshaft positioner system; and
- the controller is configured to command the crankshaft such that there is no overlap or the overlap is minimized between opening of the intake and exhaust valves of any respective cylinders to retain the heat energy in the exhaust system.

15. The heat energy retainment method of claim 10, wherein:
- the set of devices further comprises a valve control system configured to control lift/position of the intake/exhaust valves of the cylinders; and
- the controller is configured to command the valve control system to close the exhaust valves of all respective cylinders to retain the heat energy in the exhaust system.

16. The heat energy retainment method of claim 10, wherein the set of devices further comprises two or more of:
  (i) an additional valve disposed in the exhaust system upstream from the exhaust burner and the catalyst;
  (ii) at least one of a set of vanes and a wastegate of a turbocharger powered by kinetic energy of the exhaust gas;
  (iii) a crankshaft or a crankshaft positioner system configured to control a position of the crankshaft; and
  (iv) a valve control system configured to control lift/position of the intake/exhaust valves of the cylinders.

17. The heat energy retainment method of claim 10, wherein the set of devices further comprises:
  (i) an additional valve disposed in the exhaust system upstream from the exhaust burner and the catalyst;
  (ii) at least one of a set of vanes and a wastegate of a turbocharger powered by kinetic energy of the exhaust gas;
  (iii) a crankshaft or a crankshaft positioner system configured to control a position of the crankshaft; and
  (iv) a valve control system configured to control lift/position of the intake/exhaust valves of the cylinders.

* * * * *